United States Patent Office 3,700,462
Patented Oct. 24, 1972

3,700,462
BALANCED COFFEE FLAVORS
Arthur Stefanucci, 119 Merrill Road, Clifton, N.J. 07011, and Slawko Yadlowsky, 308 N. 13th Ave., Manville, N.J. 08835
No Drawing. Filed July 27, 1970, Ser. No. 58,689
Int. Cl. A23f 1/02
U.S. Cl. 99—68
21 Claims

ABSTRACT OF THE DISCLOSURE

Single varieties of coffee are divided into portions and each portion roasted to a separate and discernible average roasted color, the portions are combined and provide, on infusion, improved flavor characteristics compared to the same variety roasted to its optimum color. Blends of varieties of coffee are similarly treated. The above roasts are blended with roasted low grade coffee and mask the undesirable flavor characteristics of the low grade coffee.

BACKGROUND OF THE INVENTION

Field of the invention

The present invention relates to roasting green coffee and, more particularly, to new and improved roasting processes for improving the flavor characteristics, upon infusion, of single varieties of coffee and blends. More particularly, the present invention relates to a method of enhancing or improving the flavor of a variety of coffee by roasting portions of the coffee to separate and discernible roast colors, and thereby developing specific and desirable flavor characteristics as compared to the same coffee roasted to its optimum color and flavor.

Description of the prior art

Heretofore, various varieties of coffee and blends were roasted to a single "optimum" roast color. The "optimum" roast color is determined on the basis of consumer flavor preference for infusions prepared from the roasted coffee. The necessary roast color will vary depending on the variety or blend roasted, but is fixed for a given variety of blend by that color which gains the widest consumer acceptance, taking into account factors of the cost of production, the type of market to which the product is directed, etc. In the past, improvements in cup flavor were obtained primarily by increasing the quantity of expensive coffee, generally from the coffee plant *Coffee arabica*, and, more particularly, Milds and Brazilian coffees and/or by reducing the quantity of low cost coffee, generally from the genus Robusta.

Further flavor improvements over roasting a blend to its optimum color were made by separately roasting each variety of coffee, intended for use in the blend, to its optimum roast color for imparting its characteristic flavor contribution to the blend, and then combining the separate roasts to produce an improved blend.

SUMMARY OF THE INVENTION

It has now been discovered that by dividing a variety of coffee, particularly high cost coffee, into portions, roasting the portions to separate discernible average roast colors, and then combining the portions, there is provided an enhanced brewed or infused flavor compared to a conventional roast of the same variety of coffee to its optimum average roast color. When a blend is substituted for a single variety, a similar result is obtained. obtained.

By roasting a single variety or blend to a plurality of average roast colors and then combining the portions, a full flavor spectrum of the variety is obtained instead of the separate and distinct flavor characterized by the same variety roasted to its optimum color. Roasting to a plurality of colors produces a better balanced cup flavor, more uniformity and consistency in product quality.

The invention is particularly useful in treating high cost coffees, particularly those generally characterized in the trade as Milds such as specific varieties exemplified by Medellin, Manizales, Coatepecs, Costa Ricas, Guatemalas, Armenians, wherein the roasting of separate portions and their combination after roasting produce a greater Milds flavor and cup strength. There is also developed more winey, aromatic and acid flavors, all highly desirable in quality coffee. Furthermore, a stronger cup body produces higher flavor tolerance across recipe levels used by the consumer.

Treatment of Brazilian high quality coffees such as Santos, Paranas and the like results in a similar improvement in flavor for that variety of coffee treated, but not to the extent produced from the high quality Milds coffees.

The invention is also applicable to low grade coffees for improving their flavor characteristics in two fashions: first, a light roast of the low grade coffee when blended with varieties of high cost coffee treated by the process of this invention form a blend having improved quality flavor and reduced impact of undesirable low cost coffee flavors; secondly, where low cost coffees are first treated to remove their undesirable flavors (such as by steam stripping, which is not a part of this invention), these coffees may be roasted to a plurality of colors to enhance their desirable flavors. Accordingly, blends containing both high grade and low grade coffees treated by the process of this invention have enhanced flavor impact, flavor characteristics of higher grade flavor and a diminished or eliminated undesirable flavor produced by the lower cost coffees in the blend. There is therefore attained a substantial improvement in flavor quality of a blend without the need to increase the quantity of low cost coffees.

The principal object of this invention is to attain a substantial improvement in flavor balance or quality of roasted and ground coffee.

Another object of this invention is to provide means for developing better balanced uniform high quality flavor from a single variety of coffee.

Another object of this invention is to provide a process for roasting various varieties of coffee so that the less desirable flavor characteristics of the low cost coffee fractions are diminished in intensity or substantially eliminated.

Other objects and advantages of the invention will become apparent in the description and examples hereinafter appearing.

DETAILED DESCRIPTION OF THE INVENTION

The process of this invention involves dividing a single variety of coffee into separate portions and roasting each of the portions to a separate and discernible average roast color. The portions are then combined and there is produced a spectrum of greater flavor quality when infused than obtained by roasting the same variety of coffee to its optimum average roast color. Similar flavor improvements are obtained by roasting separate portions of a blend of varieties of coffee to separate and discernible average roast colors and recombining the roasted portions.

The process of this invention is particularly applicable to treating high cost coffees, either Milds or Brazilians, or combinations thereof. The high quality coffee treated may be either a single variety of Milds or Brazilian type, or may be a mixture of varieties characterized as either Milds or high quality Brazilians. For example, a single variety of a Milds type of coffee such as Manizales, Armenians or Medellins are divided into three portions. Each portion is then roasted to a separate and distinct roast color, namely, 45, 50 and 55. Each of the roasted portions have the following flavor characteristics when brewed or infused: the portion roasted to a 45 average roast color is characterized as winey, acid and aromatic; the portion roasted to a 50 average roast color is characterized as slightly winey, slightly aromatic and slightly woody; the portion roasted to a 55 average roast color is characterized as woody, having overall strong body and flavor balance. When the three separately roasted portions are combined, the flavor spectrum produced from the separate roasting is apparent. The combined blend gives a full flavor spectrum characteristic of Columbian coffees instead of the separate and discrete flavor obtained by roasting conventionally to a single 50 average roast color. There is obtained a better balanced cup flavor, greater uniformity of flavor and greater consistency of product quality. The winey, aromatic and acid flavor notes are more apparent.

When two or more portions of Columbian or other high quality Milds coffee are roasted either a single variety or blend containing the variety, and then combined as above, similar flavor improvements are obtained. The same is true when Brazilian high quality coffees such as Santos, Paranas or the like are similarly treated, either as individual varieties or as blends of high quality Brazilian varieties.

The process of this invention also improves the flavor quality of a blend of coffee containing high cost or quality coffee varieties whether Milds, Brazilian or mixtures thereof.

The process of this invention is also useful for improving the flavor of a blend of coffee containing a substantial amount of low cost coffees. A substantial amount of low cost coffees is that amount which produces to the consumer a noticeable low cost coffee flavor such as earthy.

Decaffeinated green coffee, when divided in portions, roasted to separate and discernible average roast colors, and recombined, are likewise characterized to have on infusion an enhanced spectrum of high quality coffee flavors, whether a single variety is treated or a blend containing high quality coffees.

In practicing the process of this invention, it is preferred to select the optimum roast color for a given variety of coffee and then roast portions of that coffee so that each portion has an average color differing by at least four color units and, preferably, 5 or more color units. For example, if the optimum average roast color for a given variety is 45, the portions may be roasted to an average roast color of 37 and 52, or 40, 45 and 50 or the like. The same technique is employed in treating a blend.

Coffee treated by the process of this invention may be further processed to produce soluble coffee having enhanced flavor characteristics. For example, high quality Milds coffees may be treated as the Columbians treated above and then extracted by conventional coffee percolation techniques and freeze dried or spray dried to produce quality soluble coffees exhibiting greater impact of flavors characteristic of quality coffee than is obtained from conventional techniques employing the same coffee roasted to its optimum color.

A preferred embodiment of this invention is to improve the roasted flavor of a blend of coffee varieties containing low cost coffee from whatever source obtained, but particularly those low cost coffees of the genus Robusta. The high cost coffees of the ultimate blend are treated by separately roasting separate varieties to at least two, but preferably three, separate and distinct roast colors, or by roasting a blend of the high cost varieties to at least two separate and distinct roast colors. The roasted high quality coffee is then blended with separately roasted low cost coffee and ground. The ground product is either packaged as an improved regular coffee or extracted with water and dried to prepare a soluble coffee. The effect of roasting the high quality coffee to three or more separate and distinct average roast colors is to improve the consumer acceptance of such a blend. Alternatively, the amount of low cost coffee employed in the blend may be increased without reducing the quality of the final roasted coffee blend when compared to blends roasted by conventional techniques.

Separate and discernible average roast colors are those colors which, when two roasted portions of coffee are compared visually by the ordinary consumer, there is detected a difference in color and when infused or brewed there is detected a difference in flavor.

It has been found that the ordinary consumer can visually and organoleptically detect a difference of three or four color units. Color units refer to a system of color measurement which uses light reflectance as a measure of color. The color of coffee is determined by grinding roasted coffee and screening it using U.S. #50 and pan. The portion that passes through U.S. #50 and is retained on pan is collected, placed in a container of 1½" diameter and ½" deep and pressed under 1200 p.s.i. on 1⅜" ram. The pressed coffee is placed beneath a photoelectric search unit of the color measuring device and the difference in reflected light 595 m$\mu$ between a standard color plate and the coffee is indicated as color units on the scale of that instrument. When a lightly roasted coffee is placed beneath the search unit, the light reflectance is greater than the standard and the needle moves to a higher reading.

The color measuring device is a photoelectric reflection model 610 having a model y10-Y search unit, manufactured by Photovolt Company. The standard color plate employed is a ceramic plate of brown color and hue. The standard brown plate exhibits the following reflection curve using magnesium oxide to represent 100% reflection.

REFLECTANCE

| Wave length, mu: | Percent reflection |
|---|---|
| 580 | 14.0 |
| 600 | 17.0 |
| 620 | 21.4 |
| 650 | 26.0 |
| 700 | 24.3 |

The process of this invention is hereby further exemplified by reference to the following examples.

EXAMPLE I

A blend of coffee composed by weight of 30% Columbians, 40% Santos and 303% Robusta is prepared by conventionally and separately roasting the Columbians to a 60 roast color, the Santos to a 60 roast color, and the Robusta to an 85 roast color. The three roasts are blended, ground, and percolated. The blend impression or taste after percolation is characterized by a high Robusta or low grade cup flavor.

EXAMPLE II

Same as Example I, except that Columbian coffee fraction is equally divided into two 15% fractions and roasted separately prior to blending with the separately roasted Santos and Robusta, i.e.

| | Amount, percent | Roast colors |
|---|---|---|
| Columbian | 30 | 55 and 65. |
| Santos | 40 | 60. |
| Robusta | 30 | 85. |

The blend impression after brewing produced a moderate Robusta flavor note.

EXAMPLE III

Same as Example I, except that the Columbian is divided in three 10% fractions as follows:

| | Amount, percent | Roast colors |
|---|---|---|
| Columbian | 30 | 50, 60, and 70. |
| Santos | 40 | 60. |
| Robusta | 30 | 85. |

The blend impression after brewing produced no detectable Robusta flavor note.

EXAMPLE IV

Same as Example I, except that the Columbian is divided into four equal 7.5% fractions as follows:

| | Amount, percent | Roast colors |
|---|---|---|
| Columbian | 30 | 45, 55, 65, and 75. |
| Santos | 40 | 50 or 60. |
| Robusta | 30 | 85. |

The blend impression after brewing produced no detectable Robusta flavor note.

EXAMPLE V

Same as Example I, except that the Santos is divided into equal 20% fractions as follows:

| | Amount, percent | Roast colors |
|---|---|---|
| Columbian | 30 | 60. |
| Santos | 40 | 60 and 70. |
| Robusta | 30 | 85. |

The blend impression after brewing produced a moderate Robusta flavor note.

EXAMPLE VI

Same as Example I, except that the Columbian is divided into equal 15% fractions and the Santos is divided into equal 20% fractions as follows:

| | Amount, percent | Roast colors |
|---|---|---|
| Columbian | 30 | 60 and 70. |
| Santos | 40 | Do. |
| Robusta | 30 | 85. |

The blend impression after brewing produced a moderate Robusta flavor note.

EXAMPLE VII

Same as Example I, except that the Santos is divided into three equal 13.3% fractions as follows:

| | Amount, percent | Roast colors |
|---|---|---|
| Columbian | 30 | 60. |
| Santos | 40 | 55, 65 and 75. |
| Robusta | 30 | 85. |

The blend impression after brewing produced no detectable Robusta flavor note.

EXAMPLE VIII

Same as Example I, except that the Santos was divided into four equal 10% fractions as follows:

| | Amount, percent | Roast colors |
|---|---|---|
| Columbian | 30 | 60. |
| Santos | 40 | 50, 60, 70 and 80. |
| Robusta | 30 | 85. |

The blend impression after brewing produced no detectable Robusta flavor note.

EXAMPLE IX

Same as Example I, except that the Columbian was divided into four equal 7.5% fractions and the Santos was divided into four equal 10% fractions as follows:

| | Amount, percent | Roast Colors |
|---|---|---|
| Columbian | 30 | 45, 55, 65 and 75. |
| Santos | 40 | 50, 60, 70 and 80. |
| Robusta | 30 | 85. |

The blend impression after brewing produced very slightly detectable Robusta flavor note.

A complete compilation of the examples is as follows:

BLEND FLAVOR IMPRESSION

| Examples | Columbian | Santos | Robusta |
|---|---|---|---|
| 1 | Very slight | Slight | High. |
| 2 | Moderate | Moderate | Moderate. |
| 3 | High | do | None. |
| 4 | Moderate | do | Do. |
| 5 | High | Slight | Moderate. |
| 6 | do | Moderate | Do. |
| 7 | do | Slight | None. |
| 8 | do | Moderate | Do. |
| 9 | do | do | Very slight. |

It will be understood that while the invention has been described with reference to the above examples, the inventive concept is not limited thereto.

What is claimed is:

1. A process for producing an improved balanced coffee flavor comprising:
    (a) dividing high cost or high quality *Coffea arabica* into portions;
    (b) roasting the portions to separate and discernible average roast colors, each average roast color differing from the others by at least four color units and wherein at least one average roast color is higher and at least one average roast color is lower than the optimum roast color of the *Coffea arabica*; and
    (c) combining the roasted portions to form a blend of coffee having improved balanced coffee flavor on infusion.

2. The process of claim 1 in which the roasts differ by at least eight color units.

3. The process of claim 1 in which the coffee is a decaffeinated coffee.

4. The process of claim 1 in which the coffee is roasted to at least three separate and discernible average roast colors.

5. The process of claim 4 in which the high cost or high quality coffee is a Milds type coffee.

6. The process of claim 4 in which the high cost or high quality coffee is a high quality Brazilian coffee.

7. The process of claim 4 in which the coffee is a single variety of Milds or high quality Brazilian coffee.

8. The process of claim 4 in which one of the separate and discernible roasts is the coffee's optimum roast color.

9. The process of claim 4 in which the coffee is combined with conventional roasts of other varieties of coffee.

10. The process of claim 9 in which the other varieties include low cost coffee.

11. The process of claim 10 in which the less desirable flavor characteristics of the low cost coffee are diminished in intensity.

12. The process of claim 11 in which the low cost coffee includes Robusta coffee and the less desirable flavor characteristics of the Robustas are substantially eliminated.

13. The process of claim 1 in which the roasted coffee is extracted by percolation and dried to form a soluble coffee.

14. The process of claim 13 in which the roasted coffee includes conventional roasts of other varieties of coffee.

15. The process of claim 1 which further includes a second high cost or high quality *Coffea arabica* roasted to separate and discernible average roast colors, each average roast color differing from the others by at least four color units and wherein at least one average roast color is higher and one average roast color is lower than the optimum roast color of the coffee.

16. The process of claim 15 wherein one high cost coffee is Milds and the second high cost coffee is high quality Brazilians.

17. The process of claim 16 in which at least one high quality coffee is roasted to at least three separate and discernible roast colors.

18. A process for producing an improved balanced coffee flavor comprising:
  (a) dividing a blend of coffee containing high cost *Coffea arabica* into portions;
  (b) roasting the portions to separate and discernible average roast colors, each average roast color differing from the others by at least four color units and wherein at least one average roast color is higher and one average roast color is lower than the optimum roast color of the coffee; and
  (c) combining the roasted portions to form a roasted blend.

19. The process according to claim 18, wherein the coffee is a decaffeinated coffee.

20. The process according to claim 19, wherein the roasted blend is extracted by percolation and the extract is freeze dried.

21. The process according to claim 19, wherein the roasted blend is extracted by percolation and the extract is spray dried.

References Cited

Sivetz: Coffee Processing Technology, vol. II (1963), pp. 83–87.

FRANK W. LUTTER, Primary Examiner

W. L. MENTLIK, Assistant Examiner

U.S. Cl. X.R.

99—71